US005604985A

United States Patent [19]

Andis et al.

[11] Patent Number: 5,604,985

[45] Date of Patent: Feb. 25, 1997

[54] HAIR TRIMMER WITH MOVABLE COMB AND LATCH

[75] Inventors: Matthew L. Andis, Racine; John M. Piwaron, Milwaukee, both of Wis.

[73] Assignee: Andis Company, Racine, Wis.

[21] Appl. No.: 296,002

[22] Filed: Aug. 25, 1994

[51] Int. Cl.[6] .............................. B26B 19/04; F16B 7/14

[52] U.S. Cl. .............................. 30/132; 30/201; 30/233.5; 403/107; 403/109; 403/329; 403/378

[58] Field of Search .............................. 30/131, 132, 133, 30/200, 201, 202, 233, 233.5, 293; 403/9, 107, 109, 203, 327, 329, 377, 378

[56] References Cited

U.S. PATENT DOCUMENTS

| | | | |
|---|---|---|---|
| 1,030,592 | 6/1912 | Leland | 403/107 |
| 2,187,372 | 1/1940 | Capaldo | 403/327 X |
| 3,986,258 | 10/1976 | Liedtke | 30/233.5 X |
| 4,557,050 | 12/1985 | Haraguchi et al. | 30/201 X |
| 4,614,036 | 9/1986 | Haraguchi | 30/233.5 X |
| 4,669,189 | 6/1987 | Ullmann | 30/233 X |
| 4,845,852 | 7/1989 | Sukow | 30/201 |
| 4,949,460 | 8/1990 | Sterk | 30/201 |
| 4,968,174 | 11/1990 | Krasznai | 403/329 X |
| 4,972,584 | 11/1990 | Baumann | 30/133 |
| 5,220,707 | 6/1993 | Newman, Sr. et al. | 403/327 X |
| 5,281,045 | 1/1994 | Ichikawa | 403/329 |

*Primary Examiner*—Rinaldi I. Rada
*Assistant Examiner*—Raymond D. Woods
*Attorney, Agent, or Firm*—Michael, Best & Friedrich

[57] ABSTRACT

A handheld appliance including a housing including a surface area, a moveable member moveable relative to the surface of the housing, and a latch for releasably preventing and permitting movement of the moveable member relative to the housing and including a series of indentations in the surface area of the housing, and a latch member movably carried on the moveable member for movement between a latch position preventing movement of the moveable member relative to the housing and a release position permitting movement of the moveable member relative to the housing, the latch member including a generally planar base portion, and a flange portion which is received in a selected one of the indentations when the latch member is in the latch position and free of the indentations when the latch member is in the release position.

11 Claims, 1 Drawing Sheet

HAIR TRIMMER WITH MOVABLE COMB AND LATCH

BACKGROUND OF THE INVENTION

The inventions relates generally to hand held appliances, such as hair trimmers. More particularly, the invention relates to hand held appliances which include a moveable part, such as a comb which is mounted over a blade set on a hair trimmer and which is movable relative to the blade set to control the length of cut.

Attention is directed to U.S. Pat. No. 4,845,852 issued Jul. 11, 1989 and to U.S. Pat. No. 4,949,460 issued Aug. 21 1990.

SUMMARY OF THE INVENTION

The invention provides a handheld appliance including a housing including a surface area, a moveable member moveable relative to the surface area of the housing, and a latch for releasably preventing and permitting movement of the moveable member relative to the housing and including a series of indentations in the surface area of the housing, and a latch member movably carried on the moveable member for movement between a latch position preventing movement of the moveable member relative to the housing and a release position permitting movement of the moveable member relative to the housing, the latch member including a generally planar base portion, and a flange portion which is received in a selected one of the indentations when the latch member is in the latch position and free of the indentations when the latch member is in the release position.

The invention also provides a hair trimmer including a housing including a surface area, a comb moveable relative to the housing and including an inner surface adjacent the surface area of the housing and having therein a groove extending in the direction of movement of the comb, and an opening communicating with the groove, a latch for releasably preventing and permitting movement of the comb member relative to thehousing and including a series of indentations in the surface area of the housing, and a latch member fabricated of resilient plastic and movably carried in the groove of the comb for movement between a latch position preventing movement of the comb relative to the housing and a release position permitting movement of the comb relative to the housing, the latch member including a generally planar base portion having spaced opposites ends extending transversely of the direction of movement of the comb, feet extenting from the base portion toward the housing to space the base portion from the surface area, a button extending from the base portion and into the opening in the comb for access by an operator to displace the button toward the housing, and a flange portion which entends from one of the opposite ends, which is received in a selected one of the indentations to retain the comb in a selected position relative the housing when the latch is in the latch position, and which is free of the indentations to permit movement of the comb relative the housing when the latch member is in the release position.

Other features and advantages of the invention will become apparent to those skilled in the art upon review of the following detailed description, claims and drawings.

Figure 1:
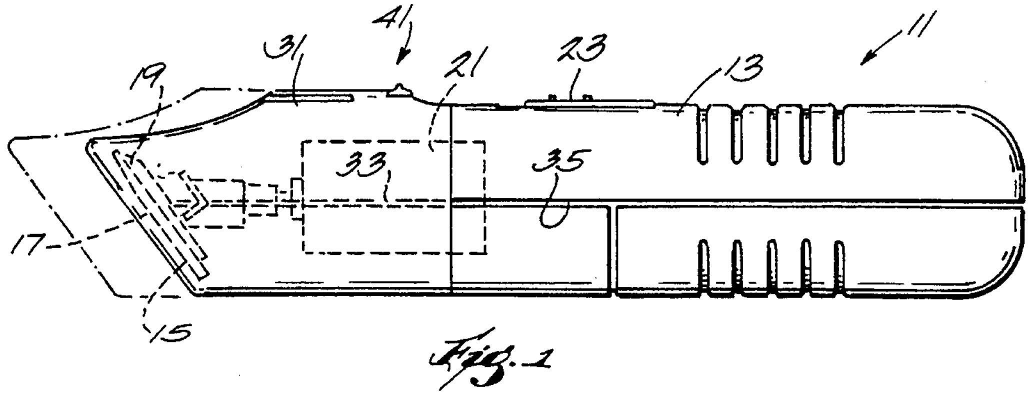
FIG. 1 is a side elevational view of a hair trimmer embodying various of the features of the invention.
Figure 2:
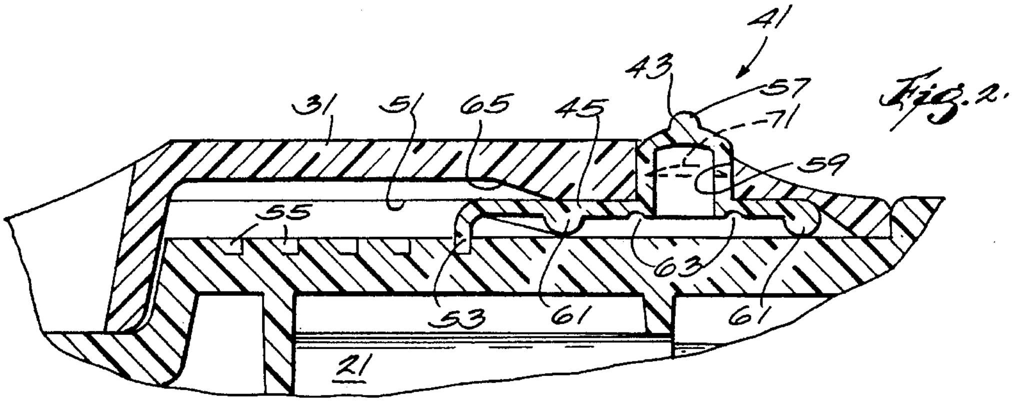
FIG. 2 is an enlarged sectional view of a portion of the hair trimmer shown in FIG. 1.
Figure 3:
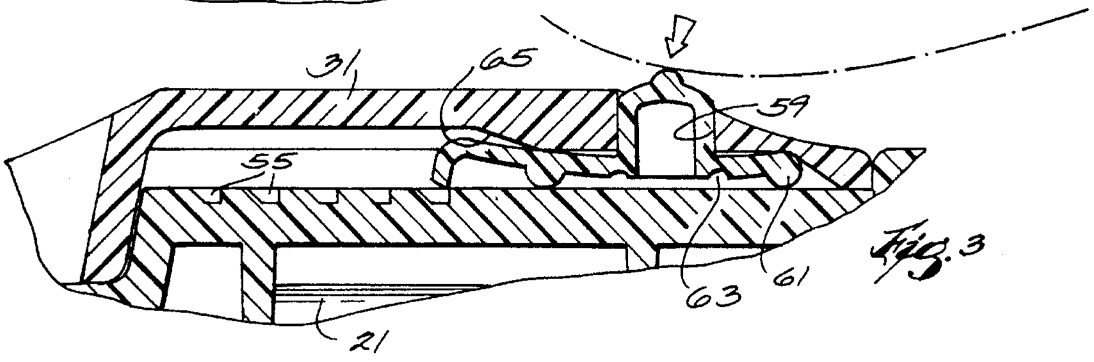
FIG. 3 is a view similiar to FIG. 2 with the button shown in a depressed position.
Figure 5:
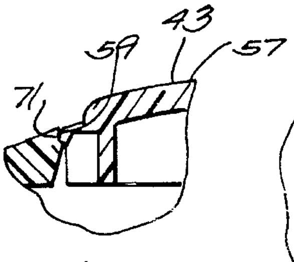
FIG. 5 is a fragmentary sectional view taken along line 5—5 of FIG. 4.
Figure 4:
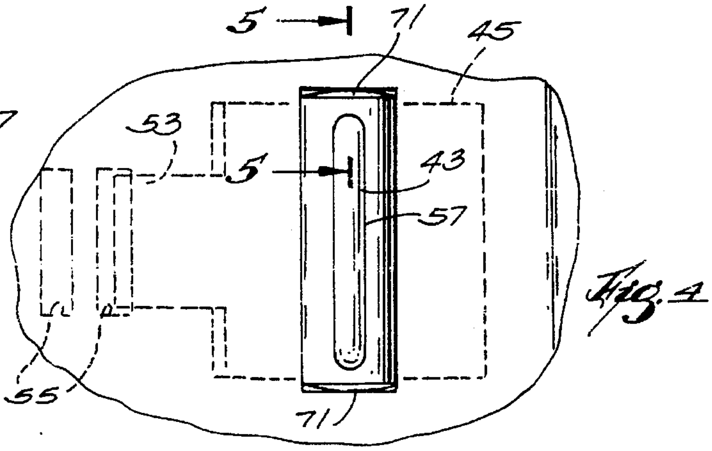
FIG. 4 is a fragmentary and enlarged top view of a portion of the hair trimmer shown in FIG. 1.

Before one embodiment of the invention is explained in detail, it is to be understood that the invention is not limited in its application to the details of the construction and the arrangements of components set forth in the following description or illustrated in the drawings. the invention is capable of other embodiments and of being practiced or being carried out in various ways. Also, it is to be understood that the phraseology and terminology used herein is for the purpose of description and should not be regarded as limiting.

GENERAL DESCRIPTION

Shown in the drawings is a handheld appliance which is in the form of an electric hair trimmer or cutter 11, although the invention is applicable to handheld appliances other than hair trimmers.

The hair trimmer 11 includes a hollow, enlongated housing 13 Which can be suitably constructed of plastic and which, at the forward end thereof, supports a cutting blade set 15 including a fixed blade 17 and a moveable blade 19 which is reciprocable relative to the fixed blade 17.

Located in the housing 13 is an electrical motor 21 which is drivingly connected to the moveable blade 19 to effect reciprocation thereof in response to actuation of the motor 21. Any suitable motor and driving arrangement can be employed.

Also included in the hair trimmer or cutter 11 is an electrical switch 23 which is connected to the motor 21 to control actuation thereof. Any suitable switch construction can be employed.

Also included in the hair trimmer 11 is a member 31 which is moveable relative to the housing 13 and which, in the disclosed construction, is in the form of a comb which encircles the forward housing end supporting the blade set 15 and which is moveable relative to the housing 13 and the blade set 15 to control the length at which hair is cut.

Suitable means are provided on the housing 13 and on the comb member 31 to afford rectilinear relative movement therebetween along a rectilinear path. While any suitable arrangement can be employed, in the disclosed construction, the comb member 31 includes, on each side, an inwardly extending rectilinear rib 33 and the housing 13 includes, on each side, a rectilinearly extending groove 35 receiving the associated one of the ribs 33.

As thus far disclosed, the construction is conventional.

The hair trimmer 11 also includes a latch 41 which selectively prevents and permits movement of the comb member 31 relative to the housing 13. While other specific constructions can be employed, in the disclosed construction, the latch 41 includes a latch member or element 43 which is moveable with the comb member 31 and relative to both the comb member 31 and the housing 13.

More particularly, the latch member 43 preferably is fabricated of resilient plastic and comprises a generally flat, thin, and rectangular base portion 45 which is located in a lengthwise rectilinear groove 51 in the inside surface of the comb member 31 and which, accordingly, is located between the comb member 31 and the housing 13.

At the forward end of the base portion 45, the latch member 43 includes a flange portion 53 which extends generally at a right angle to the base portion 43 and which is selectively receivable in a series of spaced transverse indentations 55 formed in the housing 13 so as to prevent movement of the comb member 31 relative to the housing 13.

The latch member 43 also includes a button or raised portion 57 which extends centrally between the forward and rearward ends of the base portion 45 and upwardly from the base portion for the full width thereof, and in generally parallel relation to the flange portion 53 but in the opposite direction. The button or raised portion 53 of the latch member 43 extends into and through an opening 59 in the comb member 31, which opening 59 is configured to closely but not snugly receive the button or raised portion 57 so as to enable engagement by an operator to displace the latch member 43 relative to a release position wherein the flange portion 53 is free of engagement with the indentations 55 so as to enable common movement of the comb member 31 and latch member 43 relative to the housing 13 and to a latch position wherein the flange portion 53 is engaged in one of the indentations 55 so as to prevent movement of the comb member 31 relative to the housing 13.

Means are provided for pivoting the flange portion 53 into and out of the indentations 55 in the housing 13. While other constructions can be employed, in the disclosed construction, such means comprises the before mentioned movability of the button or raised portion 57 of the latch member 43, togther with formation, along the forward and rearward edges of the base portion 45, and on the under surface thereof, of respective semicircular transverse feet or projections 61 which, as will be explained, afford rolling or rocking engagement on the housing 13 and which locate the base portion 45 in spaced relation above the housing 13.

The means for pivoting the flange portion 53 also includes means for weakening the base portion 45 so as to afford downward bending thereof. While other constructions can be emoployed, in the disclosed construction, there is provided, adjacent the forward and rearward edges of the button or raised portion 57, on the underside of the base portion 45, respective semi-circular notches or cut-outs 63. Accordingly, when the button or raised portion 57 is depressed relative to the comb member 31, the base portion 45 arcuately bends downwardly, thereby simultaneously rocking the flange portion 53 upwardly and to a raised position free of the indentations 55, and thereby permitting rectlinear movement of the comb member 31 relative to the housing 13. Because the latch member 43 is preferably fabricated of resilient plastic, when the operator terminates engagement with the button or raised portion 57 of the latch member 43, such resiliency causes the button or raised portion 57 to move outwardly relative the comb member 31, thereby permitting the base portion 45 to bend back to the flat disposition, and thereby also rocking or pivoting the flange portion 53 downwardly into one of the indentations 55 in the housing 13 to prevent relative movement of the comb member 31 relative to the housing 13.

In order to accomodate upward movement of the flange portion 53, the groove 51 in the comb member 31 includes, forewardly of the opening 59, a portion 65 of increased height.

The button or raised portion 57 of the latch member 43 includes, at each of the transverse ends thereof, an outwardly extending tab 71 which, incident to iniatial assembly of the button or raised portion 57 with the comb member 31, are resiliently deformed to permit full assembly into the comb member 31. After such assembly, the tabs 71 bend outwardly relative the comb member 31 to prevent disassembly of the button or raised portion 57 from the comb member 31.

Various of the features of the invention are set forth in the following claims.

We claim:

1. A hair trimmer including a housing including a surface area, a comb moveable in a given direction relative to said housing and including an inner surface adjacent said surface area of said housing and having therein a groove extending in the direction of movement of said comb, and an opening communicating with said groove, and a latch for releasably preventing and permitting movement of said comb member relative to said housing and including a series of indentations in said surface area of said housing, and a latch member fabricated of resilient plastic and movably carried in said groove of said comb for movement in common with said comb and for movement relative to said comb in a direction perpendicular to the given direction and between a latch position preventing movement of said comb relative to said housing and a release position permitting movement of said comb relative to said housing and including a generally planar base portion having spaced opposite ends extending transversely of the direction of movement of said comb, feet extending from said base portion toward said housing to space said base portion from said surface area, a button extending from said base portion and into said opening in said comb for access by an operator to displace said button toward said housing in the perpendicular direction between said latch and release positions, and a flange portion which extends from one of said opposite ends, which is received in a selected one of said indentations to retain said comb in a selected position relative said housing when said latch member is in said latch position, and which is free of said indentations to permit movement of said comb relative said housing when said latch member is in said release position.

2. A hair trimmer in accordance with claim 1 wherein said base portion includes, on opposite sides of said button, areas of weakness.

3. A hair trimmer in accordance with claim 1 wherein said feet have respective arcuate surfaces engaging said housing.

4. A hand held appliance including a housing including a surface area, a moveable member moveable in a given direction relative to said surface area of said housing and including therein an opening, and a latch for releasably preventing and permitting movement of said moveable member relative to said housing and including a series of indentations in said surface area of said housing, and a latch member carried for movement in common with said moveable member and for movement relative to said moveable member in a direction perpendicular to the given direction and between a latch position preventing movement of said moveable member relative to said housing and a release position permitting movement of said moveable member relative to said housing and including a generally planar base portion, a portion raised from said base portion and extending through said opening for access by a user to displace said latch member in the perpendicular direction between said latch and release positions, and a flange portion which is received in a selected one of said indentations when said latch member is in said latch position and free of said indentations when said latch member is in said release position.

5. A hand held appliance in accordance with claim 4 wherein said moveable member includes an inner surface having therein a groove extending in the direction of movement of said moveable member, and wherein said base portion is located in said groove and between said moveable member and said surface area of said housing.

6. A hand held appliance in accordance with claim 4 wherein said base portion includes opposite ends spaced from each other and extending transversely of the direction of movement of said moveable member, and wherein said latch member also includes feet extending respectively from said opposite ends and from said base portion toward said housing to space said base portion above said housing.

7. A hand held appliance in accordance with claim 6 wherein said feet are convexly formed relative to said housing.

8. A hand held appliance in accordance with claim 4 wherein said base portion includes, adjacent said raised portion, a notch providing weakness in said base portion.

9. A hand held appliance in accordance with claim 4 wherein said latch member is fabricated of resilient plastic.

10. A hand held appliance in accordance with claim 4 wherein at least one of said indentations and said flange portion include cam surfaces facilitating receipt of said flange portion in a selected one of said indentations.

11. A hand held appliance in accordance with claim 4 wherein said appliance is a hair trimmer, and said moveable member is a comb.

* * * * *